Oct. 28, 1924.  
B. T. GUEST  
1,513,040  
POWER TRANSMISSION ATTACHMENT FOR WINDMILL PUMPS  
Filed Oct. 10, 1923   3 Sheets-Sheet 2
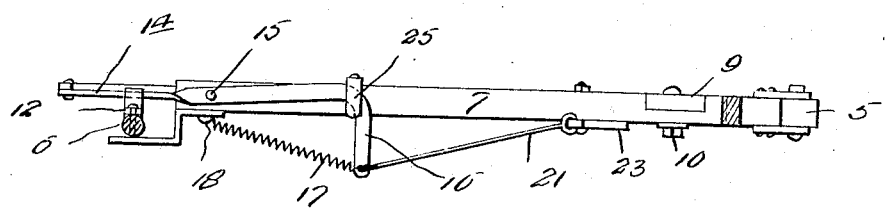
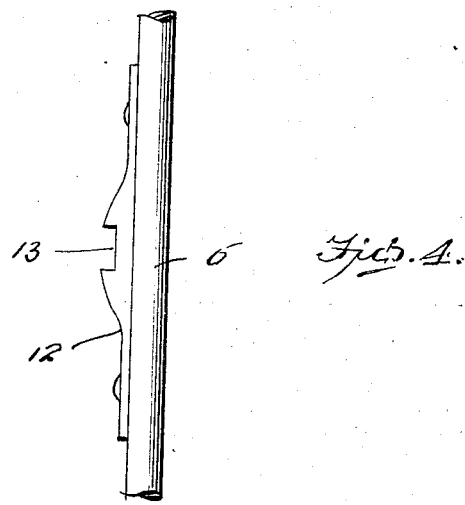
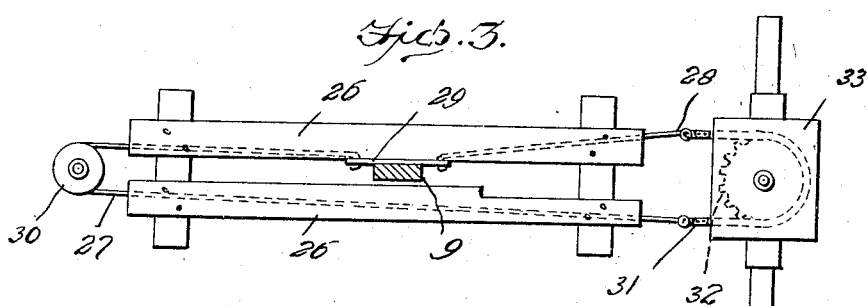
Witnesses:
Inventor  
B. T. Guest Oct. 28, 1924.
B. T. GUEST
1,513,040
POWER TRANSMISSION ATTACHMENT FOR WINDMILL PUMPS
Filed Oct. 10, 1923  3 Sheets-Sheet 3
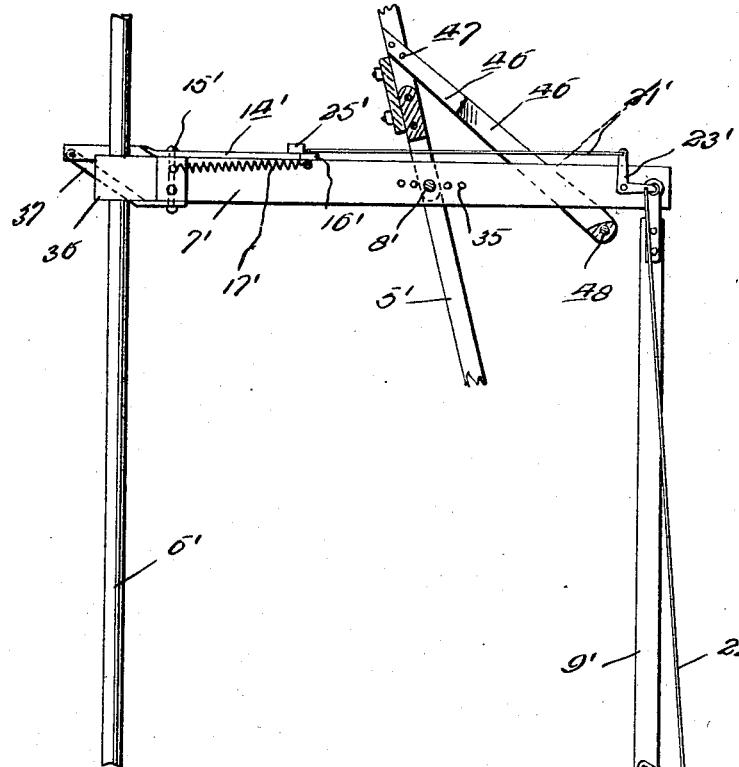
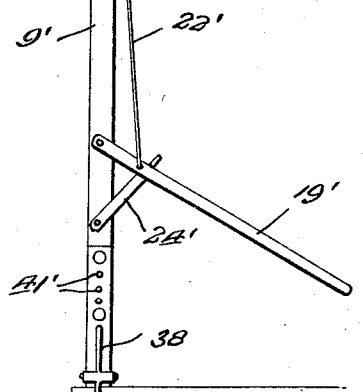
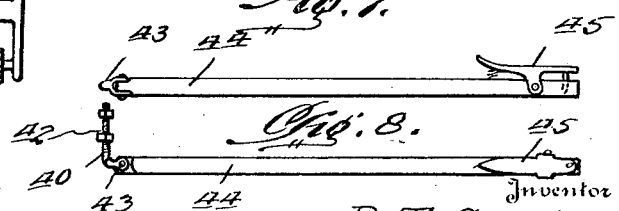
Witnesses:
Inventor
B. T. Guest
By
Attorney Patented Oct. 28, 1924.

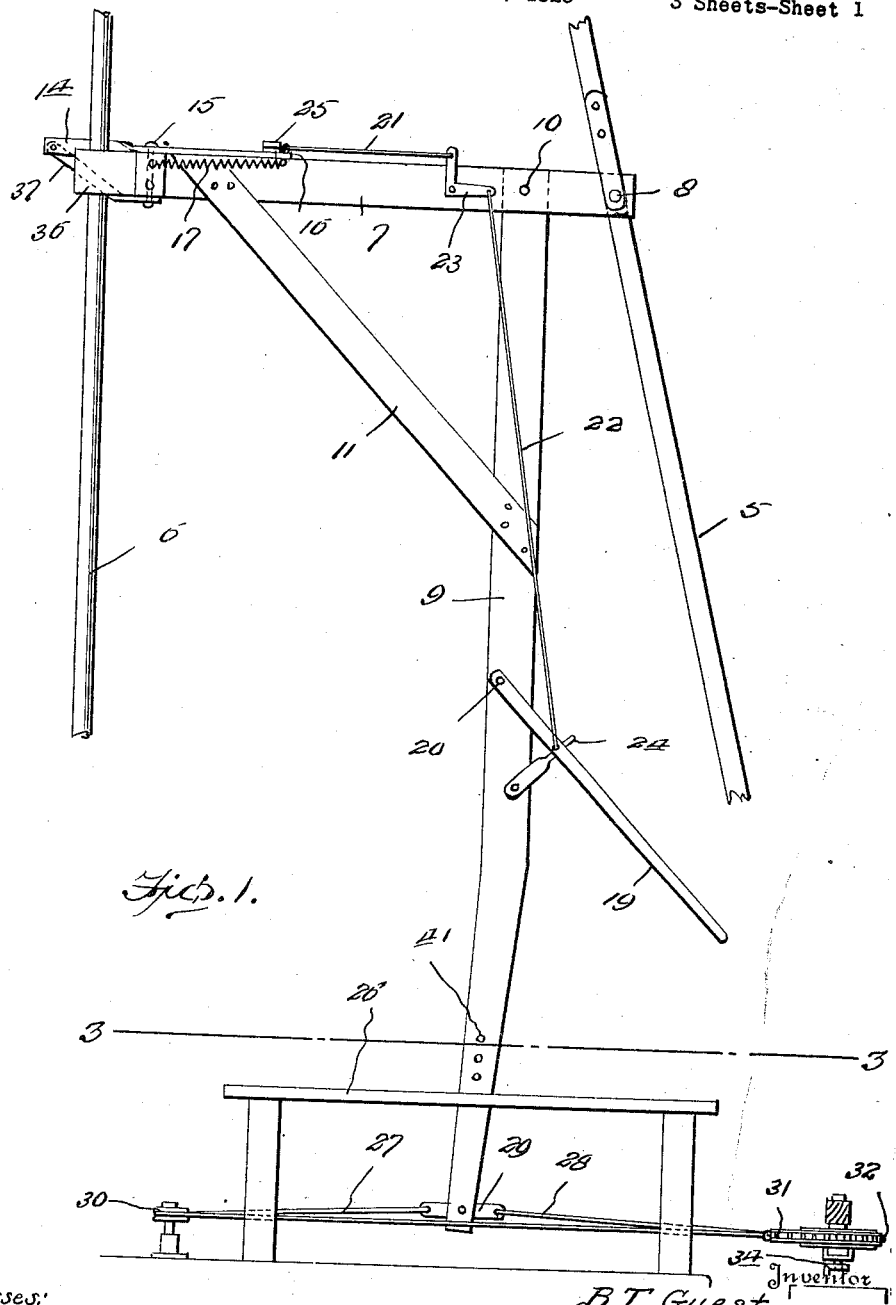

1,513,040

UNITED STATES PATENT OFFICE.

BENJAMIN T. GUEST, OF STERLING CITY, TEXAS.

POWER-TRANSMISSION ATTACHMENT FOR WINDMILL PUMPS.

Application filed October 10, 1923. Serial No. 667,687.

*To all whom it may concern:*

Be it known that I, BENJAMIN T. GUEST, a citizen of the United States, residing at Sterling City, in the county of Sterling and State of Texas, have invented certain new and useful Improvements in Power-Transmission Attachments for Windmill Pumps, of which the following is a specification.

This invention relates to a power transmission device adapted for attachment of a windmill pitman, for operating extraneous machinery, such as churns, washing machines, or the like.

An object of the invention is to provide a device of the above kind which embraces the desired qualities of simplicity and durability of construction, as well as efficiency in operation.

Another object of the invention is to provide an attachment which may be cheaply and easily installed upon existing wind mill towers, and which may be conveniently installed for rendering extraneous machinery operative or inoperative at will, and by means of which various forms or types of machinery may be operatively related to the power transmission elements forming the main part of the invention.

Other objects will appear as the nature of the invention is better understood, and the same consists in the novel form, combination, and arrangement of parts hereinafter more fully described, shown in the accompanying drawings, and claimed.

Figure 1 is a side elevational view, partly in section, showing a power transmission apparatus constructed in accordance with the present invention and adapted for operating rotary churns or washing machines, the apparatus being illustrated operatively related to a windmill tower and pitman, portions of which are shown in side elevation.

Figure 2 is a top plan view of the device shown in Figure 1, with parts removed.

Figure 3 is a horizontal sectional view, taken on the line 3—3 of Figure 1.

Figure 4 is a fragmentary elevational view illustrating the clutch element or keeper that is attached to the windmill pitman.

Figure 5 is a view similar to Figure 1, illustrating a modification of the invention adapted particularly for installation near the top of the windmill tower, when such position of the mechanism is found necessary or desirable.

Figure 6 is a fragmentary side elevational view of the lower end of the vertical arm of the bell crank lever forming part of the device shown in Figure 5.

Figure 7 is a side elevational view of a rod which may be connected to the vertical arms of either of the bell crank levers forming part of the mechanisms of Figures 1 and 5 for certain uses.

Figure 8 is a top plan view of the device shown in Figure 7.

Referring more in detail to the drawings, 5 indicates one of the inclined uprights of an ordinary windmill tower construction, inwardly of which is positioned the usual vertically reciprocable piston 6 that is operatively connected to the windmill propeller or windwheel in any suitable or well known manner, the usual purpose of the pitman 6 being to provide an operative connection between the windwheel and a pump rod as is well known in the art.

Referring to the form of the invention illustrated in Figures 1 to 4 inclusive, the invention embodies a relatively large bell crank lever having rigidly associated arms, one of which as indicated at 7 is relatively shorter and normally assumes a substantially horizontal position with its outer end pivotally connected as at 8 in any suitable manner to the frame member 5 of the windmill tower, the depending arm 9 of said bell crank lever normally assumes a substantially vertical position and is rigidly connected to the arm 7 as at 10 inwardly of the pivot 8 and for rigidity of construction, these arms are provided with an angle brace, as at 11.

Attached to the pitman 6 is a longitudinal strip 12 having a relatively long notch 13 in the outer side thereof to which is normally formed one end of a pivoted catch 14 that is mounted for horizontal swinging movement as at 15 upon the adjacent inner end of the horizontal upper arm of the bell crank lever. The catch or clutch element 14 is pivoted between its ends as clearly shown in Figure 2 and has its outer end, extended at right angles as at 15 where one end of a helical tension spring 17 is suitably coupled thereto, the other end of said spring being suitably attached as at 18 to the inner end of the arm 7. By means of this construction, the spring normally swings the catch 14 in a direction to release its inner end from the notch 13 of the pitman 6 so that the latter may freely reciprocate without effecting movement of the bell crank lever.

Carried by the lower portion of the depending arm 9 of the bell crank lever is a hand lever 19 that is pivoted as at 20 for vertical swinging movement and that is operatively connected to the outer end portion 16 of the latch 14 by means of a pair of links 21 and 22 respectively, which are respectively attached to one arm of a relatively small bell crank lever 23 and the end 16 of the catch 14 and to the other arm of said bell crank lever 23 and to the lever 19. By means of this construction, it is apparent that the catch 14 will be swung to engage in the notch 13 when the lever 19 is pulled downwardly, and in order to hold the catch 14 thus positioned, the lever 19 may be detachably held in its lowered or downwardly swung position by any suitable means such as a hook or keeper 24 carried by the arm 9 and adapted for engagement with the lever 19 as shown in Figure 1. The bell crank lever 23 is pivoted at one side of the arm 7 and in order to brace the catch 14 against vertical strains when operatively disposed in the notch 13, the outer end portion of said catch is adapted to ride under a guide 25 fixed upon the upper edge of the arm 7. Also, it is to be understood that the notch 13 is considerably longer than the width of catch 14 so as to allow for change in the angular relation of the arm 7 to the pitman 6 when the relatively large bell crank lever is swung upon the pivot 8 due to the engagement or clutching of said arm 7 with said pitman.

The power may be transmitted from the arm 9 in various ways to the machinery to be operated, and in Figures 1 and 3, one form of such mechanism is shown particularly adapted for giving a rotary reciprocatory motion to the vertical dasher shaft of a churn or washing machine. For this purpose, a pair of guide bars 26 are suitably supported at opposite sides of the lower end of the arm 9 so as to guide the latter and space the same against lateral strain. The lower end of the arm 9 thus projects downwardly between the bars 26 and is suitably attached to flexible members or cables 27 and 28, preferably by fixing a plate 29 to the lower end of the arm 9 and attaching the ends of said cables to said plates 27 as shown clearly in Figure 1. The cable 27 extends from the arm 9 in one direction to and around a horizontal guide pulley 30 that is suitably journalled at one end of the structure embodying the guide bar 6, said cable 27 then passing in the opposite direction to and connecting with one end of a chain 31 that passes around a sprocket wheel 32 positioned at the opposite end of the structure embodying the guard bars 26. The cable 28 extends in the opposite direction from the arm 9 and attaches to the outer end of the chain 31, so that when the arm 9 oscillates, a reciprocating movement will be imparted to the chain 31 for giving the sprocket wheel 32 a rotary reciprocating movement.

The sprocket wheel 32 may be provided with a suitable gear casing as indicated at 33 in Figure 3, and may be fixed to a suitable vertical shaft having any suitable means generally indicated at 34 in Figure 1 for detachably coupling the same to the upper end of the dasher shaft of a churn or washer machine or the like.

The construction above described is particularly adapted for erection near the lower portion of a wind mill tower where conditions will permit positioning of the same at this point. However, it is oftentimes impossible to so position the mechanism due to the location of tanks or other devices at this point, and it thus becomes necessary to erect the transmission mechanism at a higher point on the windmill tower. This is accomplished by a slight modification of the invention as illustrated in Figures 5 and 6, wherein 5' indicates one of the inclined uprights of the windmill tower construction and 6' indicates the pitman which is vertically reciprocated in the same manner as the pitman 6 described above. It is apparent that the frame member 5' and pitman 6' are closer together at the upper end of the windmill tower as illustrated in Figure 5 and it thus becomes necessary to pivotally mount the bell crank lever by means of a pivot 8' that extends through the upper arm 7' of the bell crank lever intermediate the ends of said arm, so that the latter will project outwardly beyond the frame member 5' as shown. To take care of necessary adjustment to be met with different installation of the mechanisms, the arm 7' may be provided with a longitudinal series of spaced openings 35 for selective reception of the pivot 8'. In this form of the invention, the depending arm 9' of the bell crank lever is suitably rigidly attached or otherwise to the extreme outer end of the arm 7' outwardly of the frame member 5'. Also, the link 21' is lengthened for connection with the bell crank lever 23' that is pivoted upon the arm 7' adjacent the upper end of the arm 9', said bell crank lever 23' being in turn connected as above described with the hand lever 19' by means of the link 22'. In this form of the invention, the pitman 6' is provided with the notched strip 12 for cooperation with the swinging catch 14' that is normally released by the spring 17' is pivotally mounted as at 15' attached to the outturned or angularly disposed outer end 16' of the catch 14', and that is provided with the guide 25' as above described, in connection with the construction shown in Figures 1 and 2.

In both forms of the invention, an angular guide plate 36 is secured upon the inner end of the relatively large bell crank lever so as to project inwardly alongside the pitman 6' or 6, at that side opposite the notched strip 12, whereby the lateral strains upon the parts will be taken care of. Also, a brace 37 is provided for the inner end of the catch 14 to take care of vertical strains thereon.

The lower end of the bell crank lever arm 9' may be provided with a resilient pivoted catch 38 that is normally spring pressed to engage in an opening in one end of a rod 39 that may have its other end suitably constructed for connection with the mechanism to be operated.

In Figures 7 and 8, a modified form of operating rod is shown for operatively connecting the lower end of the depending arm of the relatively large bell crank lever to the mechanism to be operated, and this construction embodies a bolt 40 adapted to selectively be positioned in a desired one of the longitudinal series of openings 41 and 41' of said lever arms and adapted to be retained in said selective opening by means of nuts 42 threaded thereon. The outer end of the bolt 40 is angularly bent and pivotally connected as at 43 to one end of a bar 44 that is provided upon its other end with a catch 45 similar to the catch 38. The catch 45 is particularly useful in coupling the bar 44 to a handle or lever found upon certain types of churns or washing machines.

In the construction shown in Figure 5, a suitable means is provided for limiting the downward swinging movement of the outer end of the arm 7' when the device is unclutched from the pitman 6'. This means comprises a pair of strips 46 secured as at 47 to opposite sides of the frame member 5' and extending downwardly at opposite sides of the arm 7' below the latter where their lower ends are connected by a stop 48 which is arranged to permit the oscillation of the large bell crank lever to the extent required in its operation but which will prevent undue lowering of the arm 7' at this point.

From the above description, it is apparent that with the parts disposed as shown in the drawings, the larger bell crank lever of either form of the invention will be oscillated upon vertical reciprocating motion being imparted to the pitman. This motion is then transferred by any of the means disclosed to the machinery to be operated, and by releasing the hook 24 or 24' from the levers 19 or 19', the cranks 17 or 17' will unclutch the catches 14 or 14' from the pitman 6 or 6' to render either of the constructions inoperative.

Minor changes may be made without departing from the spirit and scope of the invention as claimed.

What I claim as new is:

1. In combination with an upright frame member of a windmill tower, and a vertically reciprocable pitman arranged inwardly of said frame member, a relatively large bell crank lever including a substantially horizontal upper arm, and a depending substantially vertical arm rigidly connected together, with the depending arm adjacent the outer end of the horizontal arm, said bell crank lever being pivoted for vertical swinging movement to the frame member of the tower, means to operatively connect the lower end of said depending arm to extraneous machinery, and means manually operable at will for clutching the inner ends of the upper arm of the bell crank lever to said pitman.

2. In combination with an upright frame member of a windmill tower, and a vertically reciprocable pitman arranged inwardly of said frame member, a relatively large bell crank lever inwardly a substantially horizontal upper arm and a depending substantially vertical arm rigidly connected together with the depending arm adjacent the outer end of the horizontal arm, said bell crank lever being pivoted for vertical swinging movement to the frame member of the tower, means to operatively connect the lower end of said depending arm to extraneous machinery, means manually operable at will for clutching the inner ends of the upper arm of the bell crank lever to said pitman, and means to automatically release said upper bell crank arm from the pitman upon release of said manually operable means.

3. In combination with an upright frame member, of a windmill tower, and a vertically reciprocable pitman arranged inwardly of said frame member, a relatively large bell crank lever including a substantially horizontal upper arm and a depending substantially vertical arm rigidly connected together with the depending arm adjacent the outer end of the horizontal arm, said bell crank lever being pivoted for vertical swinging movement to the frame member of the tower, means to operatively connect the lower end of said depending arm to extraneous machinery, means manually operable at will for clutching the inner ends of the upper arm of the bell crank lever to said pitman, said last named means comprising a notched member on the pitman and a swinging catch movable into and out of the notch of said member and mounted upon the inner end portion of the bell crank arm.

In testimony whereof I affix my signature.

BENJAMIN T. GUEST.